United States Patent
Davis

(10) Patent No.: US 10,810,565 B2
(45) Date of Patent: Oct. 20, 2020

(54) VENDING DATA COMMUNICATIONS SYSTEMS

(71) Applicant: Videx, Inc., Corvallis, OR (US)

(72) Inventor: Paul R. Davis, Corvallis, OR (US)

(73) Assignee: Videx, Inc., Corvallis, OR (US)

( * ) Notice: Subject to any disclaimer, the term of this patent is extended or adjusted under 35 U.S.C. 154(b) by 550 days.

(21) Appl. No.: 15/458,130

(22) Filed: Mar. 14, 2017

(65) Prior Publication Data

US 2017/0185982 A1 Jun. 29, 2017

Related U.S. Application Data

(63) Continuation of application No. 14/074,494, filed on Nov. 7, 2013, now abandoned, which is a continuation of application No. 13/648,978, filed on Oct. 10, 2012, now Pat. No. 8,600,899.

(60) Provisional application No. 61/545,976, filed on Oct. 11, 2011.

(51) Int. Cl.
*G06Q 20/18* (2012.01)
*G06Q 20/32* (2012.01)
*G06Q 30/02* (2012.01)
*G06Q 20/20* (2012.01)

(52) U.S. Cl.
CPC .......... *G06Q 20/18* (2013.01); *G06Q 20/202* (2013.01); *G06Q 20/325* (2013.01); *G06Q 20/3278* (2013.01); *G06Q 30/0207* (2013.01); *G06Q 30/0237* (2013.01)

(58) Field of Classification Search
CPC .... G06Q 20/18; G06Q 20/202; G06Q 20/325; G06Q 20/3278; G06Q 30/0207; G06Q 30/0237

USPC .......................................................... 705/75
See application file for complete search history.

(56) References Cited

U.S. PATENT DOCUMENTS

| | | | |
|---|---|---|---|
| 6,844,813 B2 | 1/2005 | Hardman | |
| 7,167,892 B2 | 1/2007 | Defosse et al. | |
| 7,385,504 B2 | 6/2008 | Agrawal et al. | |
| 7,455,223 B1 | 11/2008 | Wilson et al. | |
| 8,103,380 B2 | 1/2012 | Cheng et al. | |
| 8,234,207 B2 | 7/2012 | Breitenbach et al. | |
| 8,413,882 B1 * | 4/2013 | Nidamarthi | G06Q 30/00 235/375 |

(Continued)

FOREIGN PATENT DOCUMENTS

| | | | | |
|---|---|---|---|---|
| EP | 2061001 A1 * | 5/2009 | | G06Q 20/327 |
| EP | 2061001 A1 | 5/2009 | | |
| WO | WO-2009154708 A1 * | 12/2009 | | G06Q 10/10 |

OTHER PUBLICATIONS

Certified English translation of EP2061001, May 20, 2009, 21 pages (Year: 2009).*

(Continued)

*Primary Examiner* — James D Nigh
(74) *Attorney, Agent, or Firm* — Chernoff Vilhauer LLP

(57) ABSTRACT

Vending machine circuitry adapted to interface with vending machine electronics so as to provide data communications between a handheld device, preferably a wireless handheld device operated by a potential consumer, and the vending machine electronics, with the handheld device providing the network communications connectivity for transmitting and receiving information to and from remote data centers, data bases, and/or servers.

9 Claims, 2 Drawing Sheets

(56) References Cited

U.S. PATENT DOCUMENTS

| | | | |
|---|---|---|---|
| 2004/0254837 A1* | 12/2004 | Roshkoff | G06Q 30/0237 705/14.13 |
| 2006/0106490 A1 | 5/2006 | Howell et al. | |
| 2006/0220845 A1 | 10/2006 | Agrawal et al. | |
| 2006/0293956 A1* | 12/2006 | Walker | G06Q 30/0238 705/14.14 |
| 2007/0050083 A1 | 3/2007 | Signorelli | |
| 2007/0073589 A1* | 3/2007 | Vergeyle | G06Q 30/0238 705/14.19 |
| 2007/0187491 A1 | 8/2007 | Godwin et al. | |
| 2009/0055281 A1 | 2/2009 | DeMedio et al. | |
| 2009/0065570 A1* | 3/2009 | Peters | G06Q 30/02 235/378 |
| 2011/0145093 A1* | 6/2011 | Paradise | G06Q 30/0613 705/26.41 |
| 2011/0173082 A1 | 7/2011 | Breitenbach | |
| 2012/0004769 A1* | 1/2012 | Hallenbeck | G07F 11/62 700/232 |
| 2012/0226698 A1* | 9/2012 | Silvestre | G06Q 30/02 707/741 |
| 2012/0278242 A1* | 11/2012 | Griffith | G06Q 30/016 705/304 |

OTHER PUBLICATIONS

Michael L. Kasavana, Innovative VDI Standards: Moving an Industry Forward, The Journal of International Management Studies, vol. 4, No. 3, Dec. 2009, 10 pgs.

Marko Hassinen and Konstantin Hypponen, "Strong Mobile Authentication", 2005 2nd International Symposium on Wireless Communication Systems, 2005, 5 pgs., IEEE Xplore Digital Library, available on the Internet <URL:http://www.ieeexplore.ieee.org/document/1547663/>.

Petition for Inter Partes Review filed in the US Patent and Trademark Office Patent Trial and Appeal Board for U.S. Appl. No. 8,600,899, filed Sep. 5, 2017, 46 pages.

* cited by examiner

VENDING DATA COMMUNICATIONS SYSTEMS

CROSS-REFERENCE TO RELATED APPLICATIONS

This is a continuation of application Ser. No. 14/074,494, filed Nov. 7, 2013, which is a continuation of application Ser. No. 13/648,978, filed Oct. 10, 2012, now U.S. Pat. No. 8,600,899 issued Dec. 3, 2013, which claims the benefit of U.S. Provisional Application No. 61/545,976, filed Oct. 11, 2011.

BACKGROUND OF THE INVENTION

This disclosure relates generally to product dispensing kiosk, vending machine, or self-serving automatic merchandising systems (hereinafter, vending systems) and data communications methods therefor, and, more particularly, to electrical and electro-mechanical devices and systems for enhanced vending system capabilities such as, for example, product dispensing control, cashless payment methods, physical vending machine access control, and internal and external data communications, data sharing, and information collection.

Vending Data Interchange (VDI) standards have been developed by the National Automatic Merchandising Association (NAMA) to provide technology providers non-proprietary protocols and methods for sharing machine-level data between various components of a vending machine and vending machine data communication systems. The VDI standards are intended to ensure reliability, continuity, and longevity for installed vending machine hardware, software, and netware. A particularly useful article, *Innovative VDI Standards: Moving an Industry Forward*, by Michael L. Kasavana, The Journal of International Management Studies, Vol. 4, No. 3, December 2009, (hereinafter, Kasavana) is excerpted in the background section below and is incorporated herein by reference in its entirety.

Kasavana mentions the essence of the VDI standards is to allow for data movement through a messaging technique to ensure data integrity of transmitted sets of data, regardless whether the data was pulled from a network server or pushed to such a server. The protocols are designed to package vending machine-level data (such as DEX and MDB data, alerts data, cashless transaction data, etc.) in a format that allows sharing between different supplier systems and multiple software applications. The packaged data might be analogous to email messaging in that the file of machine captured data forms the content of the message, and the VDI programming introduces a wrapper for distribution to any number of file servers (the wrapper being similar in function to the distribution list for an email message), independent of the particular manufacturer or service provider.

DEX is an acronym for Data EXchange and is capable of capturing machine-level cash in/out data, product movement data, and financial audit data. DEX data is designed to assist vending operators develop product replenishment strategies, product mix rotations, and cash management safeguards.

MDB is an acronym for Multi-Drop Bus and is an internal (vending machine) communication protocol designed to ensure effective interface between coin mechanisms, bill validators, and cashless payment devices and a Vending Machine Controller (VMC). An MDB cable (or machine harness) provides physical connectivity for attaching peripheral devices (such as card reader, bill validator, etc.) to the VMC of a vending machine. MDB defines a serial bus interface for electronically controlled vending machines, and MDB/ICP (Multi-Drop Bus/Internal Communication Protocol) governs the interface between a vending machine controller and payment system peripheral devices. MDB/ICP enables the VMC to determine what coins in the coin changer and what bills in the bill validator can be accepted for cash payment. MDB/ICP also establishes the amount of credit available through a payment card reader.

The MDB/ICP standard defines a serial master-slave communication bus used by the internal devices in the vending machine, such as a coin acceptor. MDB allows for immediate updating of the current status of the machine as each product is sold. In this way the MDB standard is considered a transaction-based mechanism. DEX on the other hand, is a cumulative-based reporting system. MDB allows for the attachment of an audit (DEX) device that (acting as a passive slave) receives information for all events happening on the vending machine (such as vends, sold outs, coins and bills accepted, etc.). DEX involves the retrieval of stored information (or a snapshot of machine status) through a serial plug for connecting to, for example, a laptop PC.

Cashless transactions rely on MDB processes (eg. details of the transaction such as card number, transaction value, product(s) sold, date, and time, for reconciliation) whereas DEX is needed for sales reporting. A DEX cable may be used to transfer DEX file information along with the cashless MDB data.

DEX-enabled (or DEX-compliant) vending machines may be configured to transmit data to a polling device. Local polling may use a handheld device or pocket probe designed to plug into a vending machine's DEX-port or to communication via an IR port. A typical upload takes approximately five seconds. The field collected data may then be transferred from the handheld device to a central office computer for processing and report generation.

Remote data collection options include dial-up polling and wireless polling. Dial-up polling may be used, involing a modem and telephone line connected to the vending machine. DEX data can be transported to a remote office or warehouse location for evaluation via an internet or virtual private network (VPN) connection. Wireless polling, similar to dial-up polling, may be used whereby the vending machine is equipped with cellular network connectivity.

These remote data collection options, however, are costly since each requires additional communications capabilities integral to the vending machine and monthly (telephone or cellular) access fees. Cellular connectivity also presents challenges based on the architectural structure surrounding the vending equipment combined with strength of cell signal strength requirements. While connectivity to the internet or a VPN may be more direct and less susceptible to structural infringements, such connectivity may be more costly.

What is needed, therefore, are electrical and electro-mechanical devices and systems for enhanced vending system capabilities such as, for example, product dispensing control, cashless payment methods, physical vending machine access control, and internal and external data communications, data sharing, and information collection, that, among other features and capabilities desirable to the vending industry, address these and other shortcomings of existing vending systems.

BRIEF DESCRIPTION OF THE SEVERAL VIEWS OF THE DRAWINGS

For a more complete understanding of the present invention, the drawings herein illustrate examples of the inven

DETAILED DESCRIPTION OF PREFERRED EMBODIMENTS

In the following detailed description, numerous specific details are set forth in order to provide a thorough understanding of the preferred embodiments. However, those skilled in the art will understand that the present invention may be practiced without these specific details, that the present invention is not limited to the depicted embodiments, and that the present invention may be practiced in a variety of alternate embodiments. In other instances, well known methods, procedures, components, and systems have not been described in detail.

As an overview, the preferred embodiments generally involve circuitry adapted to interface with vending machine electronics so as to provide data communications between a handheld device, preferably a wireless handheld device operated by a potential consumer using the vending machine, and the vending machine electronics, with the handheld device providing the network communications connectivity for transmitting and receiving information to and from remote data centers, data bases, and/or servers. Preferred embodiments may include circuitry adapted to provide data communications between the vending machine electronics and an external networked device, with the external networked device providing the aforementioned network communications connectivity. Further, preferred embodiments may include circuitry adapted to interface with physical access control for the vending machine, providing additional security features and functionality such as vending machine access audit information and backup/secondary lock actuation capabilities for accessing the vending machine in the event of failure of primary power supply or vending machine electronics.

Various embodiments include additional inventive aspects, for example methods of allowing cashless transactions using an un-networked vending machine, collecting consumer feedback information, utilizing a consumer's communication device to process prior vending transactions, and managing loss using geographically relevant transaction information. Various described embodiments also include inventive methods for providing consumer incentives to encourage permitted use of the consumer's handheld communication device capabilities. For example, the consumer may be provided with transaction progress information, options for determining the amount of time needed for a given transaction, or chance-based rewards in exchange for providing collectable consumer feedback information and/or use of the consumer's communication device computing and/or network communication capabilities.

Figure 1:
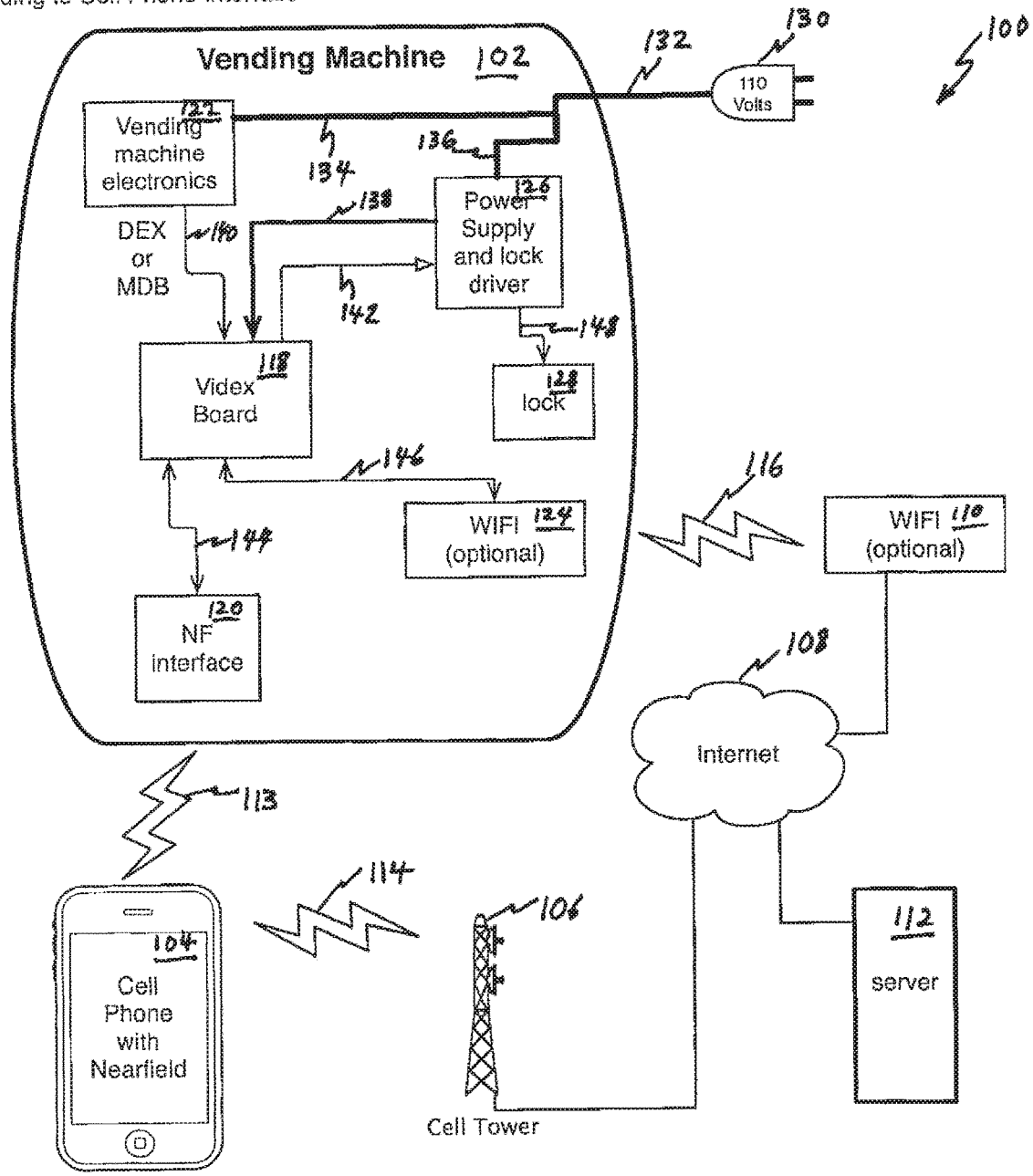
- FIG. 1 is an exemplary diagram of a vending machine system, according to preferred embodiments.

Although the preferred embodiments may be implemented in a wide variety of configurations involving different types of product dispensing kiosks, vending machines, or self-serving automatic merchandising systems, collectively referred to as vending systems, various architectures for such vending systems, and specific networks and network architectures and topologies, the following detailed description discloses the preferred embodiments principally in the context of an exemplary vending machine-to-cell phone interface, as illustrated in FIG. 1. As shown in FIG. 1, a vending machine (or product dispensing kiosk or self-serving automatic merchandising machine) system 100 comprises a vending machine 102 adapted so as to utilize a handheld communication device 104 for cashless vending, transmission of DEX information, and other functions available via the handheld device.

In one embodiment, the handheld communication device 104 is a cell phone equipped with near field, Bluetooth, wifi, audio, optical, electrical contact-based, or other means for communicating with an appropriate communications interface associated with the vending machine 102. The cell phone 104 is then networked via wireless cellular communications 114, cell network/cell tower 106, and internet 108 for communication with a central station, data base, or server 112. As shown in FIG. 1, the cell phone 104 may be equipped with Near Field Communications (NFC) circuitry for wireless communications 113 with vending machine near field interface 120. The near field interface (circuitry) 120 in turn communicates 144 with circuitry (shown as Videx board) 118 adapted to communicate 140 (for example, DEX and/or MDB data, alerts data, cashless transaction data, etc.) with vending machine electronics 122.

The vending machine 102 preferably includes vending machine electronics 122 with circuitry adapted for providing DEX or MDB data via communication bus 140 to communications circuitry (Videx board) 118. The vending machine electronics 122 receives power via power line 134, external power cord 132, and regular 110VAC outlet plug 130. Communications circuitry (Videx board) 118 preferably receives DEX or MDB data from said vending machine electronics 122 via data bus 140, and receives power via power line 138, power supply and lock driver circuitry 126, and power line 136 (which, in one embodiment, is interconnected to power line 134 and power cord 132.

The power supply and lock driver circuitry 126 preferably includes circuitry adapted to control actuation via 148 of an electronic lock 128 in response to control signals via 142 from the communications circuitry (Videx board) 118. The power supply and lock driver circuitry 126 preferably includes circuitry adapted to receive a signal modulated on one or more power line conductors 132, 136. The circuitry is adapted to receive the modulated signal, demodulate the signal to obtain a transmitted access code, and energize the lock driver circuitry 126 to actuate the electronic lock 128 if the transmitted access code matches an access code stored in non-volatile memory.

The vending machine 102 may optionally include wifi circuitry 124 interconnected with the communications circuitry (Videx board) 118 via 146. The wifi circuitry 124 is preferably adapted to wirelessly communicate 116 with an internet access point or other wifi enabled device 110 external to said vending machine 102. The wifi enable device 110 may comprise, in one embodiment, a handheld or portable computing device or communications device having tethering (wireless internet) capabilities and connectivity. The communications circuitry (Videx board) 118 is then coupled with the wifi enabled device 110 so as to provide connectivity between an internet 108 connected server 112 and the vending machine 102 so that DEX or MDB or other data may be exchanged between the server 112 and vending machine 102.

Figure 2:
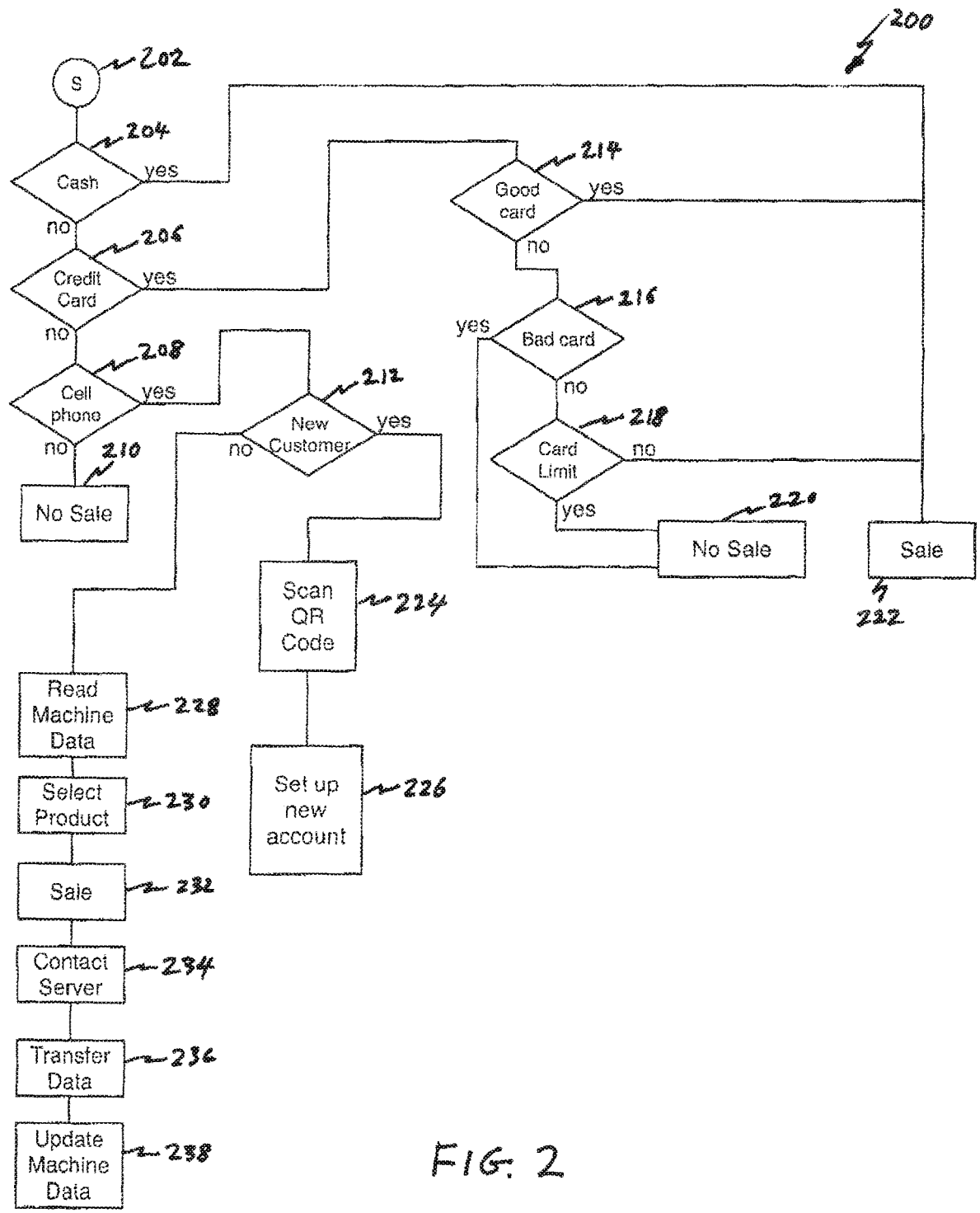
FIG. 2 is an exemplary operational flow chart, according to various embodiments.

In operation, the vending data communications system 100 allows for various methods of vending product from a vending machine. In preferred embodiments, the methods 200 shown in FIG. 2, of vending product from a vending machine 102, include various combinations of the vending steps shown. In one embodiment, vending from vending machine 102 starts 202 with accepting one or more payment method, for example cash 204, credit/debit/payment card 206, and cell phone 208 as means for payment. No sale 210 is progressed or made unless a payment method is accepted. If cash 204 is chosen, then the vending machine performs in a traditional manner to make the sale 222 using conventional cash transaction means.

The vending machine 102 preferably checks for a presented card 206 (for example, a credit card, debit card, or some other type of funds or account or gift card recognizable by a card reader or card readers on the vending machine 102). If the presented card 206 (i.e. its number or other identifying indicia) appears on a good card list 214 stored in memory, then a sale 222 is allowed. If the presented card 206 appears on a bad card list 216, then no sale 220 is allowed. However, if the presented card 206 is neither on the good list 214 nor the bad card list 216, a sale 222 is allowed unless the presented card 206 (having been previously added to an unknown card list) has exceeded a card limit 218. The card limit 218 is preferably based on factors such as the total number of products purchased (without payment confirmation and, thereafter removal of the presented card 206 from the unknown list and placement onto the good card list 214), an amount of time between attempted sales or a frequency of attempted sales, and/or geographical information associated with the presented card 206. For example, an unknown card (i.e. one that has not yet been classified as good or bad based upon payment confirmation information) may be permitted for payment for a maximum predetermined number of products, or for a maximum of one product per hour or other time period, or for a certain number of total products in a given geographical area, or for a certain number of products depending upon where the presented card originates. A presented card originating locally, for instance, may present higher risk of loss, at least until such card is reclassified as good or bad, than a presented card originating from farther away. A tourist, for example, might be allowed to use an unknown card to vend product, expecting that such a presented card would carry lower risk of loss/non-payment.

The vending machine 102 preferably checks for a cell phone 208 presented as a form of payment. In one embodiment, the user of the presented cell phone 208 holds their cell phone (having a Near Field Communications interface) up to a receiving zone/proximity on the outside of vending machine 102 so as to facilitate/allow the cell phone to communicate with the vending machine's communications circuitry (and near field interface). The machine checks whether the presented cell phone 208 indicates a new customer 212, and, if so, invites the user of the presented cell phone to scan a QR or other optical code 224 provided by the vending machine 102. The user scans the optical code with the presented cell phone 208 to access a new customer account set up website 226, or the user is invited to access the new customer account set up website by typing in the website address on the presented cell phone.

Once in the new customer account set up website (or cell/smart phone application), the user enters their credit card (or debit card) payment authorization information, charge limits, deposited cash/funds account (amount, etc.), and provides agreements needed for use of vending services, beverage company policies, etc. In one embodiment, the user may choose from options to make purchases using a pre-paid card, a credit card, a debit card, a pre-paid account with a particular product company (i.e. a particular beverage company), or even to capture purchases on (and pay via) their cell phone service provider's monthly billing statements.

Preferably, the user is given options to use their credit card, or debit card, or a pre-deposited funds account for beverage/vending purchases as well as options for receiving and using reward points/credits in exchange for allowing use of their cell phone for downloading and uploading DEX and/or MDB data to and from the vending machine 102 and for use of their cell phone cellular network service for further vending-related data communications (for example, with server 112 as shown in FIG. 1). The user is preferably given the option to allow their cell phone to be used to collect and transmit data (including unprocessed previous vends information that need to be reconciled for payment confirmations and re-classification of the previously presented cards) to servers (as illustrated in FIG. 1). The user is preferably given options as to tolerable wait times (for collecting data while at a vending machine such as machine 102) and options for providing additional consumer feedback (i.e. product taste preferences, packaging preferences, etc.) in exchange for product credits or other rewards or incentives.

The vending machine 102 checks whether the presented cell phone 208 indicates a registered customer 212, and, if the presented cell phone indicates the user and presented cell phone correspond to a registered customer, the vending machine 102 begins reading machine data 228 from the vending machine 102 to the presented cell phone while waiting for the user to select product 230 from said vending machine, and allow sale 232 of the user selected product.

The presented cell phone 208 preferably collects the read machine data 228 regardless of whether the presented cell phone 208 is connected to or has an available cellular network connection. The read machine data 228 is preferably stored in memory in the presented cell phone 208 for later transmission and/or use (by an application residing on the presented cell phone 208 and/or in response to a network server 112) once the presented cell phone 208 becomes connected to a cellular network (or wifi or other network for connecting with server 112) or once the user of the presented cell phone 208 chooses to allow cellular network or other network connectivity and subsequent vending-related data transfer/communications.

Preferably during the allowed sale 232, and if the presented cell phone 208 is connected to a cellular network, a network server is contacted 234 (such as server 112 shown in FIG. 1) using the cellular connection of the presented cell phone 208. Wth a cellular connection and connection to server 112, data is then transferred 236 between the network server 112 and the presented cell phone 208 and machine data is updated 238. Updated machine data 238 is communicated from the server 112 to the presented cell phone 208, and then back to the vending machine 102 via the Near Field Communications 113 between the presented cell phone 208 and the vending machine 102 NFC interface 120.

In preferred embodiments, the reading of machine data 228 from the vending machine 102 to the presented cell phone includes transmitting unprocessed credit card vending sales information (likely including such information for previous users of the vending machine 102 other than the instant user of the currently presented cell phone 208) for subsequent transfer by the presented cell phone 208 to a network server 112 for payment processing, and transmitting DEX and other vending machine data from the vending machine 102 to the presented cell phone 208.

In one embodiment, the reading of machine data 228 includes communication of a pointer or data reference so that only machine data that is needed is transferred. For example, if another user's interactions with vending machine 102 resulted in partial updating of the machine data, up to a particular pointer reference, then only updates beyond that pointer reference would still be needed and therefore requested from a currently presented cell phone 208. In preferred embodiments, the pointer or data reference point is communicated back to the server 112. The pointer is preferably communicated back to the particular vending machine 102. The pointer is preferably passed to the next customer that presents a cell phone as payment to the vending machine 102. In one embodiment, the maximum number of data records, assuming one record per vendable product, might be the number of vended and vendable product associated with the vending machine. If the vending machine 102 (not having its own internal network communications means) is not visited and interacted with (by a registered customer) for downloading/updating of machine data, payment confirmations, etc., then the service technician performing monthly restocking and maintenance would have to at most download the data records for those vended and vendable product. In one embodiment, the service technician may use a presented cell phone 208 to interact with (and transmit DEX, MDB, and other vending machine data) the vending machine 102 as would a another customer interacting with the vending machine 102 via their cell phone.

Regarding physical access into the vending machine 102, for example, by a service technician, according to one embodiment the vending machine 102 comprises a card reader (whether swipe magnetic and/or proximity type reader) with the vending machine 102 checking whether a presented card 206 authorizes access control of the vending machine 102 for physical access into the machine (for the restocking, maintenance, and servicing thereof) and energizing lock driver circuitry 126 and actuating an electronic lock 128 in response to the presented card 206.

The service technician may also, in one embodiment, gain access to the vending machine 102 by actuating the electronic lock 128 via authenticated communications using a presented cell phone 208. The technician preferably uses a secure cell phone application to communicate with the communications circuitry (Videx board) 118 to activate the lock driver circuitry 126 via connection 142 to actuate (open) the electronic lock 128.

Another way to gain entry to vending machine 102, preferably as a backup/secondary method, is for the service technician to use an X10-type device (a power line carrier device) that modulates a signal onto the power line 132 via interconnection with standard outlet plug 130. X10 uses RF bursts at a frequency different than the 50 to 60 Hz AC (110 volt) power band, typically encoding/modulating a signal onto a 120 kHz carrier. The service technician may simply unplug the vending machine 102 standard power supply plug 130, plug the vending machine power supply plug into the X10-type device, and finally plug the X10-type device back into the standard 110 VAC wall outlet to power both the X10-type device and the vending machine 102.

In preferred embodiments, the vending machine 102 includes power supply and lock driver circuitry 126 that is interconnected with the primary power line 134 (inside the machine 102), cord 132, and standard machine outlet plug 130. The power supply and lock driver circuitry 126 preferably includes circuitry for receiving a signal modulated on one or more of the conductors of the power lines/plug 134, 132, 130, circuitry for demodulating the signal to obtain a transmitted access code, and energizing the lock driver circuitry 126 to actuate (open) the electronic lock 128 if the transmitted access code matches a stored access code (thereby authenticating operation of the electronic lock).

Portions of circuitry needed for the aforementioned electronic lock operation may be divided differently than described above or as illustrated in FIG. 1. For example, the stored access code may reside in memory associated with the communications circuitry (Videx board) 118 or with the portion of circuitry shown as power supply and lock driver 126. Likewise, the circuitry for receiving and demodulating an X10-type power line carrier signal may reside in the communication circuitry (Videx board) 118 rather than with the lock driver circuitry 126. The modulated signal may be fed to the communications circuitry (Videx board) 118 via power supply line 138.

It is also to be understood that the particular arrangement and aggregation of circuitry shown in vending machine 102 in FIG. 1 may be re-arranged, in various alternate embodiments. For example, the Near Field Communications interface 120 and/or optional wifi circuitry/interface 124 may be collocated and integrated with the communications circuitry (Videx board) 118. Likewise, portions of the power supply and lock driver circuitry 126 may be integral to one or more of the other functional blocks shown in FIG. 1, for instance integral with the communications circuitry (Videx board) 118.

In preferred embodiments, the user accounts (such as smartphone applications and customer account websites) and use of the user's cell phone data collecting and data communications capabilities are adapted for collecting consumer feedback information. In exchange for allowing use of the user's cellular connectivity for data collecting and for providing feedback on product attributes, the user's/customers are preferably provided credits, rewards, or other incentives. For example, a T-shirt give-away may be communicated to user's via their cell/smart phones in exchange for providing particular feedback as to a specific vended product. The specific vended product may comprise a product with slight modification (for example, the addition of a trace amount of a flavoring or mineral or nutrient) where the consumer may use a QR code (for example on the inside/underside of a beverage cap/lid or on the product packaging) to access a consumer feedback space that is specific to that particular modified product and for the specific consumer (based on the consumer's customer registration/account/cell phone identification information). Different QR codes may be used to differentiate product from different vended product suppliers (i.e. different bottlers). Using QR codes to identify batches of product, for example, provides a blind (higher quality) consumer feedback mechanism. Feedback is preferably collected and directed to, for example, particular bottling companies by the server 112.

Modified product, in preferred embodiments, may be introduced in a particular geographic region, in particular times of the year (seasons), and to accommodate particular regional cultures and taste preferences, all of which may be conveniently tracked using the aforementioned vending data communications systems and methods for collecting high quality, real-time or very near real-time, product specific consumer feedback. Various described embodiments include inventive methods for providing consumer incentives to encourage permitted use of the consumer's handheld communication device capabilities. For example, the consumer may be provided with transaction progress information. As data communications proceed, the consumer is preferably provided with a progress bar visual queue that also includes a visual indication of the reward credits being accumulated, in real-time. Incentives may be offered to registered customers for visiting particularly remote vending machines (for improving data collection and communications with those particular un-networked vending machines).

Options are preferably given to the consumer regarding the amount of time needed for a transaction. Preferably, customers using payment by cell phone are given a dynamic amount of time for their transaction with vending machine 102. For example, if a registered customer would otherwise prefer to receive additional credits and rewards but for immediate time pressures, the customer is preferably given options to cut short the transaction. As the transaction is cut short, perhaps facilitated by giving the customer an option to press a button (preferably on their cell/smart phone) communication of a pointer or data reference is used so as to minimize the amount of time needed to conclude the customer transaction. The customer is preferably shown rewards/benefits of allowing more time/more updates to proceed.

Further incentives, according to preferred embodiments, include chance-based rewards in exchange for providing collectable consumer feedback information and/or use of the consumer's communication device computing and/or network communication capabilities. For example, a consumer may receive chances for winning particular merchandise and rewards for permitting use of the consumer's cell phone network for vending data communications.

Cost savings to vending machine operators and owners, by utilizing un-networked vending machines, include the recurring monthly cellular, telephone, or other communications network access fees, in addition to the particular electronics necessary for interconnecting/networking stand alone vending machines. Added costs for circuitry and electronics such as the communications circuitry (Videx board) 118 and other interface, power supply, and related circuitry are low, offset by savings found in the selection and design of electronic lock related components used in the vending machine, and offset by costs saved by eliminating monthly/recurring network access fees as well as the monthly/recurring fees charged by vending telemetry service providers and cashless service providers.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

I claim:

1. A method, performed by a data processing device having a short range communication interface and a long range communication interface, for collecting consumer feedback information from a user of a vending machine, the method comprising:

establishing a wireless communications link between communications circuitry of the vending machine and the short range communication interface of the data processing device;

transmitting, from the data processing device to the vending machine through the wireless communications link, payment information corresponding to a request to dispense a selected product from the vending machine;

capturing, at an imaging device of the data processing device, an image of a machine-readable code affixed to the selected product, the machine-readable code including a product identifier that identifies the selected product as having a product modification;

generating, at a display of the data processing device and based on the product identifier, a user interface configured for receiving user input including consumer feedback information relating to the product modification;

receiving, at the user interface, consumer feedback information indicative of the user's evaluation of an attribute of the selected product, the attribute corresponding to the product modification; and transmitting, via the long range communication interface to a server located away from the vending machine and the data processing device, the consumer feedback information indicative of the user's evaluation of the attribute.

2. The method of claim 1, wherein the machine-readable code is a matrix barcode encoded according to a quick response (QR) code standard.

3. The method of claim 1, wherein the wireless communications link is established in accordance with a near field communication (NFC) protocol.

4. The method of claim 1, wherein the long range communication interface comprises a cellular network interface.

5. The method of claim 1, further comprising:
providing a reward incentive as consideration for providing consumer feedback information.

6. The method of claim 5, wherein the reward incentive is selected from the group consisting of a monetary value, a loyalty program credit for participation in a loyalty program associated with the vending machine, a credit toward the purchase price of the selected product, and a giveaway prize item.

7. The method of claim 1, wherein the selected product is an edible item and wherein the attribute is selected from the group consisting of a taste attribute, a texture attribute, a scent attribute, and a visual appearance attribute.

8. The method of claim 7, wherein the selected product comprises a product modification characterized by the addition of a flavoring agent or a mineral.

9. The method of claim 1, wherein the user interface does not present an indication of the product modification to the user.

* * * * *